United States Patent [19]
Van De Venne et al.

[11] Patent Number: 5,711,652
[45] Date of Patent: Jan. 27, 1998

[54] ELECTRICALLY DRIVEN AIR PUMP HAVING A DRIVE MOTOR BALANCED IN SITU

[75] Inventors: Günter Van De Venne, Mönchengladbach; Rainer Peters, Goch; Klaus Muckelmann, Düsseldorf, all of Germany

[73] Assignee: Pierburg AG, Neuss, Germany

[21] Appl. No.: 549,960

[22] Filed: Oct. 30, 1995

[30] Foreign Application Priority Data

Oct. 29, 1994 [DE] Germany .................. 44 38 750.4

[51] Int. Cl.⁶ .................. F04D 29/22; B64C 27/72
[52] U.S. Cl. .................. 416/144; 415/199.1; 415/199.2; 417/423.15
[58] Field of Search .................. 416/144; 415/199.1, 415/199.2

[56] References Cited

U.S. PATENT DOCUMENTS

| | | | |
|---|---|---|---|
| 2,486,619 | 11/1949 | Troxler | 415/199.2 |
| 2,857,849 | 10/1958 | Pezzillo | 415/199.2 |
| 4,585,963 | 4/1986 | Wilkinson, Jr. et al. | 310/67 |

FOREIGN PATENT DOCUMENTS

| | | |
|---|---|---|
| 0385298 | 9/1982 | European Pat. Off. . |
| 0385298A3 | 9/1990 | European Pat. Off. . |
| 0607515 | 7/1994 | European Pat. Off. . |
| 89043383 | 8/1989 | Germany . |
| 3038298 | 5/1992 | Germany . |
| 4107049 | 9/1992 | Germany . |
| 93034709 | 7/1994 | Germany . |
| 2328653 | 2/1995 | Germany . |

OTHER PUBLICATIONS

Database WPI, Section CH, Week 7502 Derwent Publications, Ltd. London GB, Class A88, AN 750220lw.

*Primary Examiner*—Timothy Thorpe
*Assistant Examiner*—Cheryl J. Tyler
*Attorney, Agent, or Firm*—Ladas & Parry

[57] ABSTRACT

An electrically driven air pump having a pump mechanism in a first section of a housing and an electric motor in a second section of the housing in driving engagement with the pump mechanism. First and second end covers are sealingly secured on the housing. The electric motor is supported by elastomer rings in the housing. The pump mechanism has two axially spaced rotor wheels secured on the drive shaft of the motor and a stator wheel between the rotor wheels. The electric motor is balanced, in situ, in its mounted state by adjusting that one of the rotor wheels which is exposed in the housing prior to installation of the end cover on the first section of the housing. After the motor is balanced, the end cover is press fit on the housing and stator wheel to form air-tight, friction fit seal joints therebetween in which the engaged parts which are deformed elastically or plastically.

13 Claims, 2 Drawing Sheets

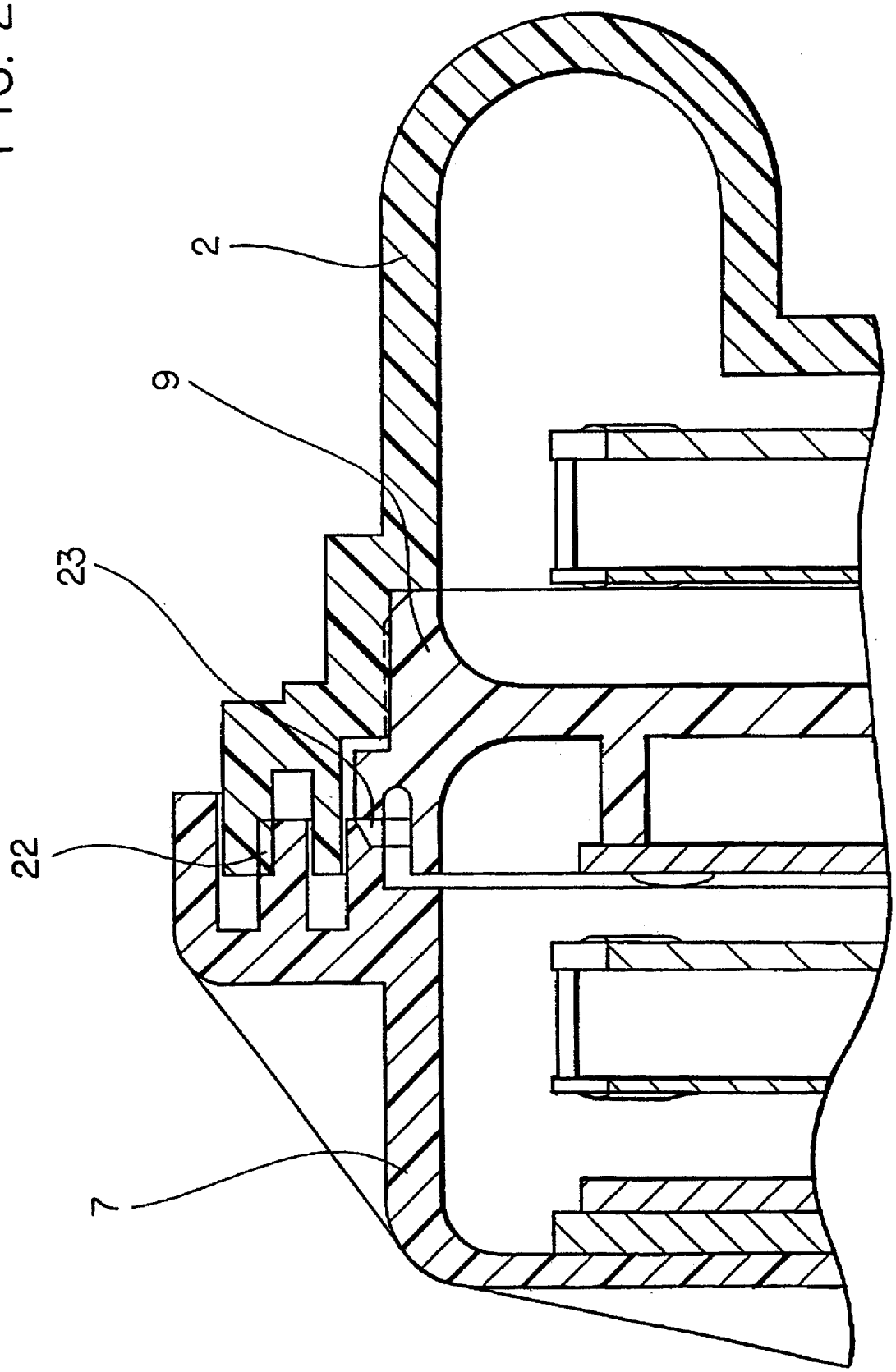

ELECTRICALLY DRIVEN AIR PUMP HAVING A DRIVE MOTOR BALANCED IN SITU

CROSS-RELATED APPLICATION

Ser. No. 08/549,959 filed on even date by the same applicant, now U.S. Pat. No. 5,639,228.

FIELD OF THE INVENTION

The invention relates to an electrically driven air pump such as for use in motor vehicles to pump secondary air into the exhaust system in order to reduce pollutants in the exhaust gases.

More particularly, the invention relates to such an air pump having a balanced drive motor and to its method of balancing.

BACKGROUND AND PRIOR ART

EPA 0 385 298 A2 discloses an electrically driven air pump whose operation is accompanied by vibrations of variable magnitude due to imbalance of the rotor wheel and the electric motor as well as to the magnetic rotating field which is produced. These vibrations are transported to the pump support or to the apparatus to which it is connected and produces a high frequency operating noise.

DE-A1 41 07 049 discloses an electrically driven air pump which includes means for reducing the vibration and operating noise. Principally, such means comprises two elastomer rings between the electric motor and the housing for support of the motor. The rings are arranged between the electric motor and the housing in a particular fashion in which the second ring is supported by the housing through a spring acting under tension between a cover and the elastomer ring.

Although the above measures lead to a reduction in the vibration and operating noise of the electrically driven air pump, it involves considerable cost for the manufacture of the structural parts. In addition, the various sealed joints may become unsealed due to the multiplicity of structural parts which are connected by screws whereby the efficiency of the pump is reduced.

SUMMARY OF THE INVENTION

An object of the invention is to provide an air pump having reduced vibration and operating noise with permanent, sealed joints and with a simplified construction of the pump.

It has been discovered that even though drive motors, which have been precision balanced, are installed in the pumps, substantial operating noise is nevertheless generated in individual pumps. This is due to the mounting of the motors in the pump.

In order to avoid this disadvantage, the invention provides for balancing the drive motor, after installation thereof in the pump, while the pump is still open and not yet sealed.

In accordance with the invention, the drive motor is balanced in situ, in its mounted state in the pump housing by applying balance weights to a rotor wheel of the pump mechanism which is secured to and driven by the electric motor.

The balancing of the drive motor is carried out with the housing cover off and the rotor exposed, and after the installed motor is balanced, the cover is mounted on the housing in sealed relation.

In further accordance with the invention, the cover is press fit onto the housing to produce an air-tight seal joint therebetween.

BRIEF DESCRIPTION OF THE FIGURES OF THE DRAWING

FIG. 2 is a detailed view on enlarged scale of a portion of the apparatus of FIG. 1.

DETAILED DESCRIPTION OF A PREFERRED EMBODIMENT

Figure 1:
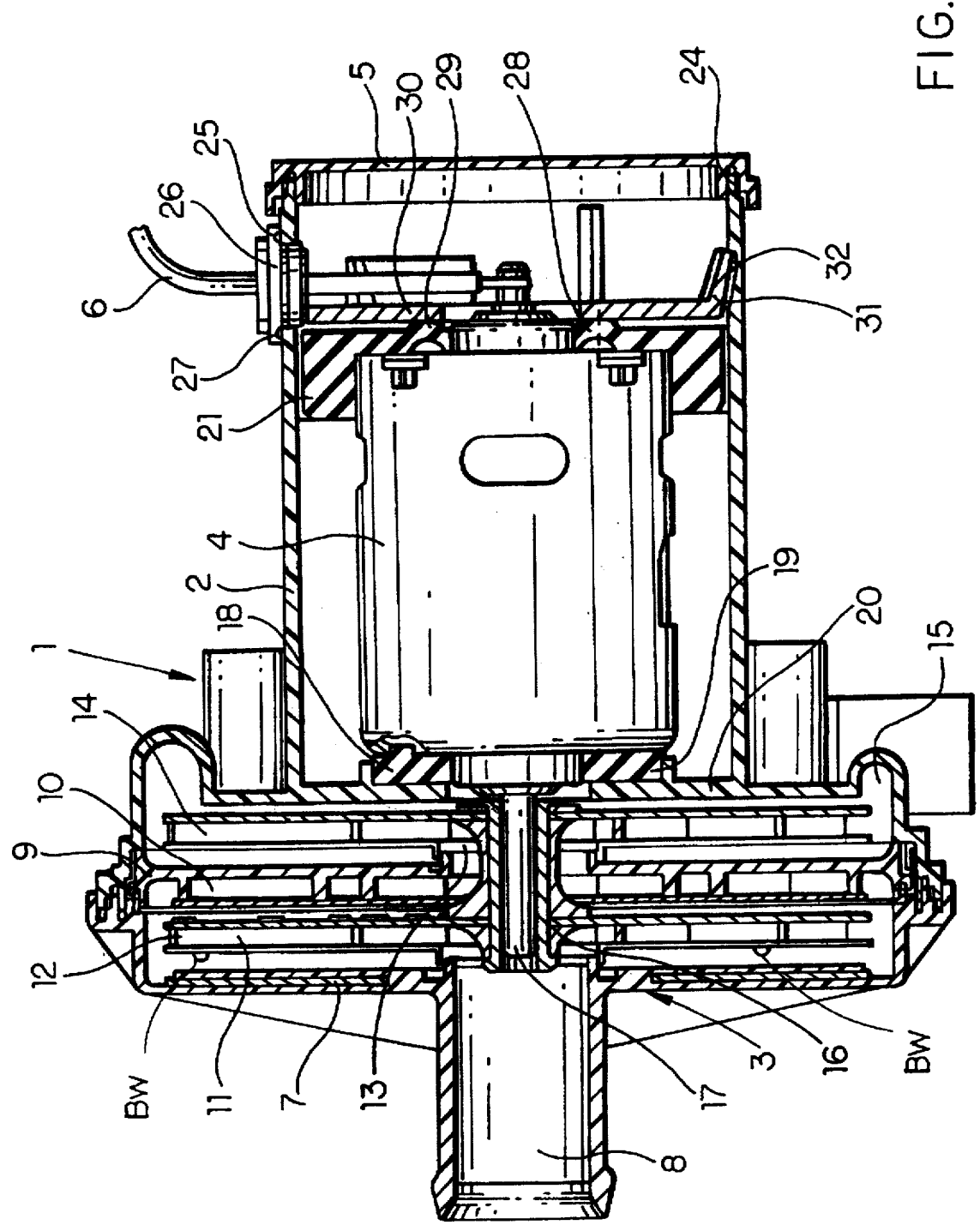
FIG. 1 is a longitudinal section through one embodiment of an electrically driven air pump apparatus according to the invention.

FIG. 1 shows an air pump 1 for pumping secondary air to an exhaust system of an internal combustion engine (not shown). The pump 1 comprises a housing 2, made of plastic material, having a first section receiving a pump mechanism 3 and a second section receiving an electric motor 4. A cover 5 is secured on the second section of the housing and forms an air-tight seal thereat. An electrical cable 6 of the motor 4 extends from the motor through a side wall of the housing. At the opposite end of the housing, a cover 7 seals the first section of the housing containing the pump mechanism 3. The cover 7 has a connector 8 for inlet of air into the housing.

The pump mechanism 3 comprises a stator wheel 10 having channels 10 for air guidance, a first rotor wheel 11 disposed adjacent to the stator wheel 10 to receive the inlet air from connector 8 and to pump the air radially outwards for discharge at outlet 12, where the air is directed by the channels 10 in the stator wheel 9 inwardly to an inlet 13 of a second rotor wheel 14 disposed on the side of the stator wheel opposite the rotor wheel 11. This arrangement represents a two stage pumping section and if more stages are provided, a subsequent stator wheel and rotor wheel follow the rotor wheel 14. The housing 2 is provided with an annular channel 15 which receives the pumped air from the rotor wheel of the last pumping stage (rotor wheel 14 in FIG. 1) to discharge the air under pressure to an outlet connection (not shown) which supplies the air to the internal combustion engine.

The electric motor 4 is supported in the second section of the housing by first and second elastomer rings 18 and 21. The first elastomer ring 18 is mounted in a recess 19 in a housing wall 20 separating the first and second sections of the housing.

In accordance with the invention, the electric motor 4, with a hub 16 of the rotor wheels 11 and 14 installed on the motor output shaft 17, is balanced, in situ, while the first section is still open i.e. cover 7 has not yet been installed. In order to balance the motor, balance weights BW are placed on the exposed rotor wheel 11. The balance can be a static balance, a speed balance or both. The stator wheel 9 is arranged between the rotor wheels 11 and 14 and the stator wheel is secured in housing 2 radially, axially and rotationally and is sealed in air-tight relation when the cover 7 is mounted on the housing. Thereby, the pump pressure stages are separated from one another by the stator wheel.

The cover 7, stator wheel 9 and housing 2 are made of plastic material and are joined and sealed by friction-fit, lock joints 22 and 23 between the engaged parts. The lock joints are formed by an interference fit between the engaged parts at the joints, which results in elastic or plastic deformation between the parts. Referring in particular to FIG. 2, lock joint 22 is formed between annular legs on cover 7 and housing 2 facing one another, while the lock joint 23 is provided between annular legs on the cover 7 and the stator wheel 9 facing one another. The lock joints 22, 23 are formed by forcing the cover 7 onto the housing 2 and the stator wheel 9, which produces elastic and/or plastic deformation between the mating parts and an air-tight, friction-fit seal thereat. In the case of seal joint 23, the annular edge of the stator wheel 9 is formed with a sharp point to bite into the depending leg of the cover 7 to produce the friction-fit joint. At joint 22, an interference fit is achieved between the mating parts which results in an annular, frictional fit therebetween.

The seal joints are produced by press fitting the cover 7 on the housing 2 and the stator wheel 9 which constitutes a substantial improvement over the construction heretofore known in the art which required a number of structural parts, gaskets and fasteners, all of which are eliminated. Moreover, the joints 22 and 23 are air-tight and remain so indefinitely.

In order to permit the electrical cable 6 to pass through the side wall of the housing 2, the wall is provided with an opening 25 whose axis extends at right angles to the longitudinal axis of the motor 4. The opening 25 is closed and sealed by a seal cap 26. The cover 5 is closed and sealed on the housing 2 by a friction-fit joint 24. A friction-fit joint 27 is formed between the cap 26 and the housing 2. In this way, all of the structural parts are joined in air-tight, sealed engagement by frictional joints produced by elastic or plastic deformation due to interference fit at joints 22, 23, 24, 27.

In order to apply a resilient axial force to the electric motor 4 to urge the motor against the elastomer ring 18, the elastomer ring 21 is formed with an annular bead 28 that can be elastically deformed in the axial direction. The bead 28 bears against a surface 29 of a support ring 30 which is provided with radially projecting clips 31 engaged in corresponding recesses 32 in the side wall of housing 2. This arrangement reduces operating noise and simplifies the mounting of the electrical motor with a minimum number of parts.

Although the invention has been described in relation to a specific embodiment thereof, it will become apparent to those skilled in the art that numerous modifications and variations can be made within the scope and spirit of the invention as defined in the attached claims.

What is claimed is:

1. A method of balancing an electric motor in an electrically driven air pump comprising:
    mounting an electric motor in a first section of a housing of an electrically driven air pump such that an output shaft of the motor with two rotor wheels secured thereon project into an open pumping section of the housing wherein a stator wheel is disposed between the rotor wheels and forms pumping stages on opposite sides of the stator wheel;
    balancing the electric motor, in situ, in its mounted state by adjusting one of the rotor wheels which is exposed in said open pumping section; and
    installing a cover on the housing to permanently close and seal the pumping section after the motor has been balanced.

2. A method as claimed in claim 1, wherein the adjusting of said one of the rotor wheels is effected by securing balancing weights on said one rotor wheel.

3. A method as claimed in claim 2, wherein the balancing of the electric motor includes driving the output shaft and thereby said rotors thereon, of the electric motor in rotation.

4. A method as claimed in claim 1, wherein when the cover is installed on the housing, said cover sealingly engages said stator wheel and said housing.

5. A method as claimed in claim 4, wherein said cover, stator wheel and housing are made of plastic and said cover sealingly engages said stator wheel and said housing by air-tight friction-fit therewith.

6. A method as claimed in claim 5, wherein said air-tight friction-fit of said cover with said stator wheel and said housing includes producing an interference fit between said cover and said stator wheel and said housing by elastically or plastically deforming mating parts of said cover, said stator wheel and said housing.

7. A method as claimed in claim 1, wherein said electric motor has an electrical cable passing through a hole provided in a side wall of the housing, said method further comprising sealing the hole in the housing through which the cable passes by friction-fitting a sealing cap with the housing at said hole.

8. A method as claimed in claim 7, further comprising an end cover on said first section of the housing and sealing said end cover to said first section of the housing by friction-fitting therewith.

9. An electrically driven air pump comprising:
    a housing having first and second sections;
    an electric motor mounted in said first section of the housing;
    a pumping mechanism in said second section of the housing, said electric motor having an output shaft projecting into said second section, said pumping mechanism comprising first and second rotor wheels secured to said output shaft, and a stator wheel fixed to said housing and interposed between said rotor wheels to form pumping stages on opposite sides of said stator wheel, one of said rotor wheels being disposed in said second section outwards of said stator wheel and exposed in said second section;
    means associated with said one of said rotor wheels for balancing said electric motor and said pumping mechanism, in situ, in their mounted state in said housing; and
    a cover permanently fitted on said housing and enclosing said second section, said cover being friction-fitted to said stator wheel and to said housing by press fitting said cover on said stator wheel and said housing subsequent to balancing of said electric motor.

10. An electrically driven air pump as claimed in claim 9, wherein said cover, housing and stator wheel are made of plastic material and have mating parts which are elastically or plastically deformed upon press fitting the cover on the housing and stator wheel.

11. An electrically driven air pump as claimed in claim 9, wherein said electric motor has an electrical cable passing through a hole provided in a side wall of said housing, said apparatus further comprising a sealing cap at said hole, said sealing cap and said housing being made of plastic material and being frictionally engaged to seal said hole, said housing having second cover for closing said first section also made of plastic and frictionally engaged with said first section of the housing to form an air-tight seal therewith.

12. An electrically driven air pump as claimed in claim 9, wherein said housing and cover form an enclosure for said electric motor and said pump mechanism, said enclosure having an air inlet for supplying air to said pumping mechanism and an air outlet for discharge of air pumped by said pumping mechanism.

13. An electrically driven air pump as claimed in claim 9, wherein said means for balancing the motor comprises balancing weights applied to said one rotor wheel.

* * * * *